United States Patent [19]

Morrissette

[11] Patent Number: 4,635,956
[45] Date of Patent: Jan. 13, 1987

[54] COLLAPSIBLE CART

[76] Inventor: Roger J. Morrissette, 265 N. Woodstock Rd., Southbridge, Mass. 01550

[21] Appl. No.: 711,599

[22] Filed: Mar. 13, 1985

[51] Int. Cl.$^4$ .................................................. B62B 1/04
[52] U.S. Cl. ..................................... 280/652; 280/63; 280/659; 280/47.26; 296/27
[58] Field of Search ............... 280/652, 653, 655, 656, 280/659, 639, 47.26, 63, 47.18, 47.33, 47.31; 296/27, 29, 32, 36, 35.4, 180

[56] References Cited

U.S. PATENT DOCUMENTS

| | | | |
|---|---|---|---|
| 1,134,258 | 4/1915 | Curtis | 280/47.18 |
| 2,720,413 | 10/1955 | Halverson | 296/27 |
| 2,784,979 | 3/1957 | Chamberlin et al. | 280/47.26 |
| 3,236,198 | 2/1966 | Kreft | 296/27 |
| 3,815,767 | 6/1974 | Lund et al. | 280/47.18 |
| 4,383,695 | 5/1983 | Ray | 280/47.26 |
| 4,416,484 | 11/1983 | O'Neill | 296/36 |

FOREIGN PATENT DOCUMENTS 786137 11/1957 United Kingdom ............... 280/659
1361874 7/1974 United Kingdom ............... 280/656

Primary Examiner—John J. Love
Assistant Examiner—Eric D. Culbreth
Attorney, Agent, or Firm—Blodgett & Blodgett

[57] ABSTRACT

A collapsible cart comprising a collapsible storage basket which is mounted on a frame consisting of a longitudinal frame member and a horizontal cross frame member. A pair of wheels are rotatably mounted on the opposite ends of the cross frame member. The frame includes supporting means for supporting the storage basket on the frame members when the basket is in the expanded state and when it is in the collapsed state.

5 Claims, 8 Drawing Figures

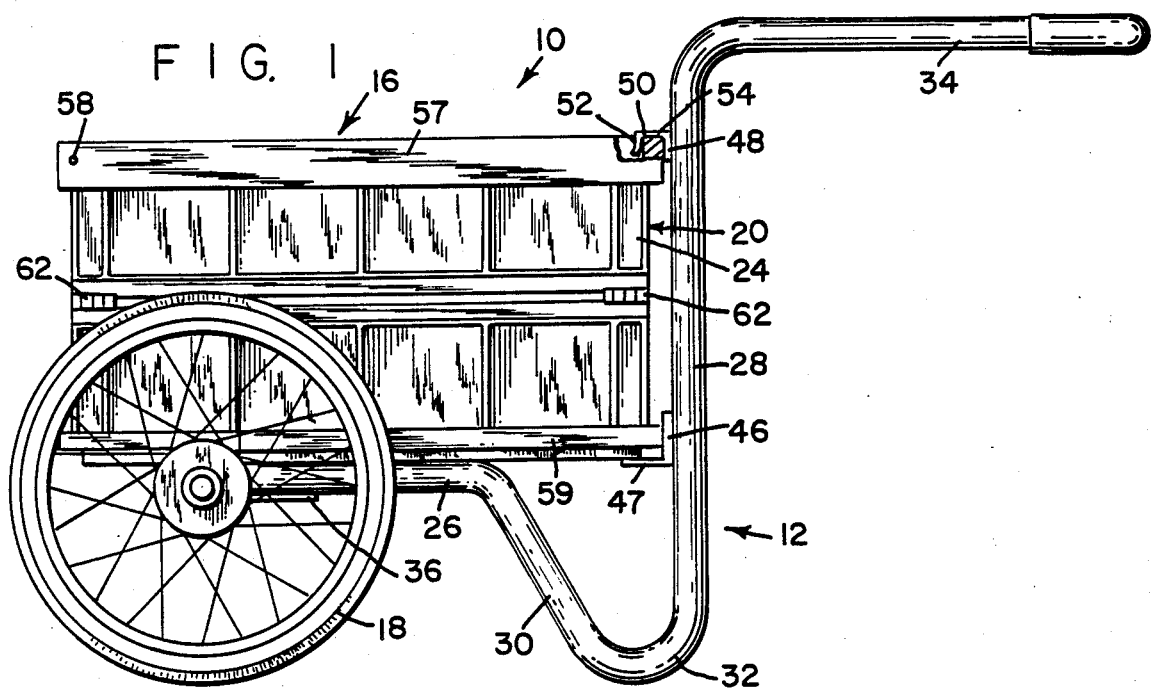
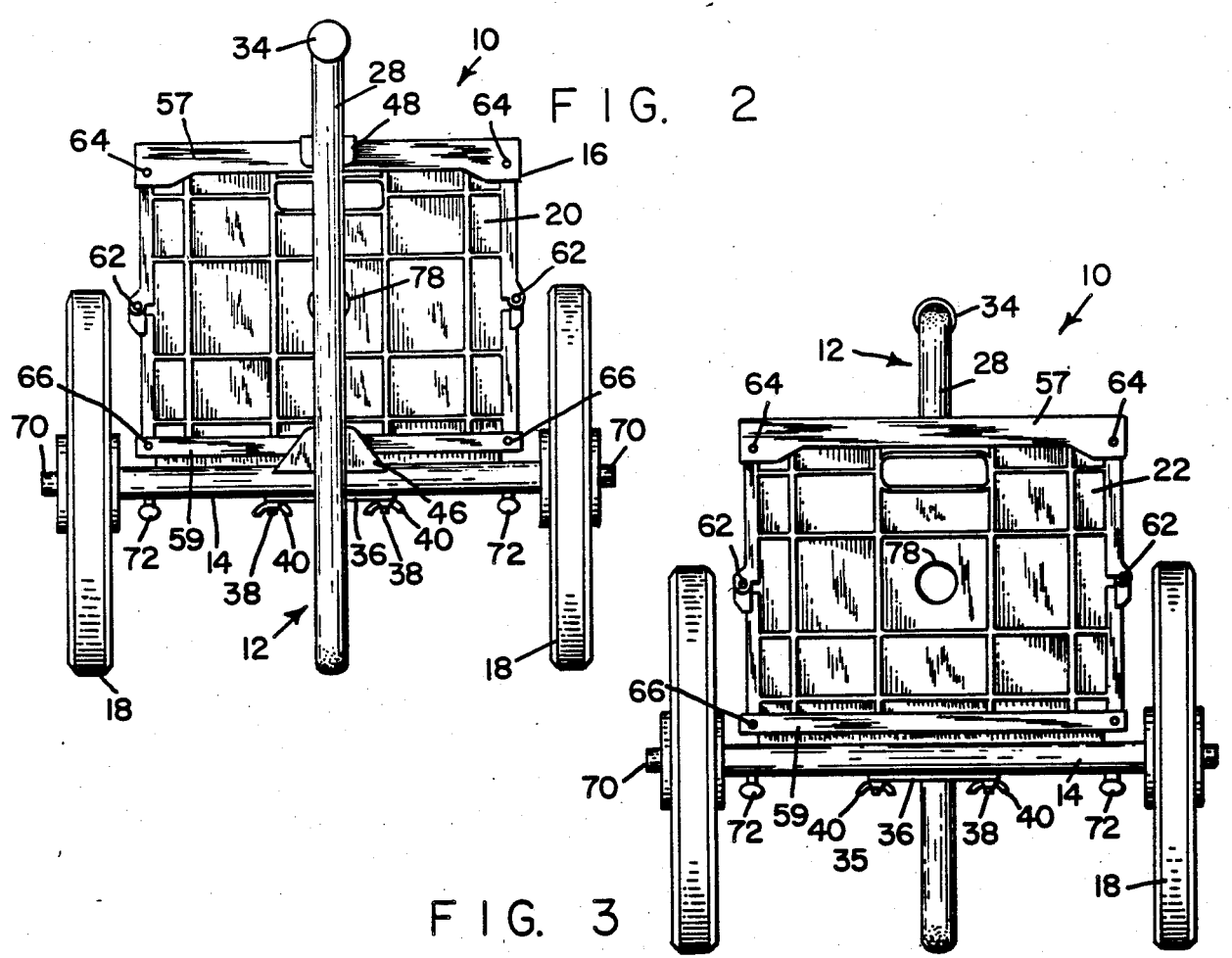

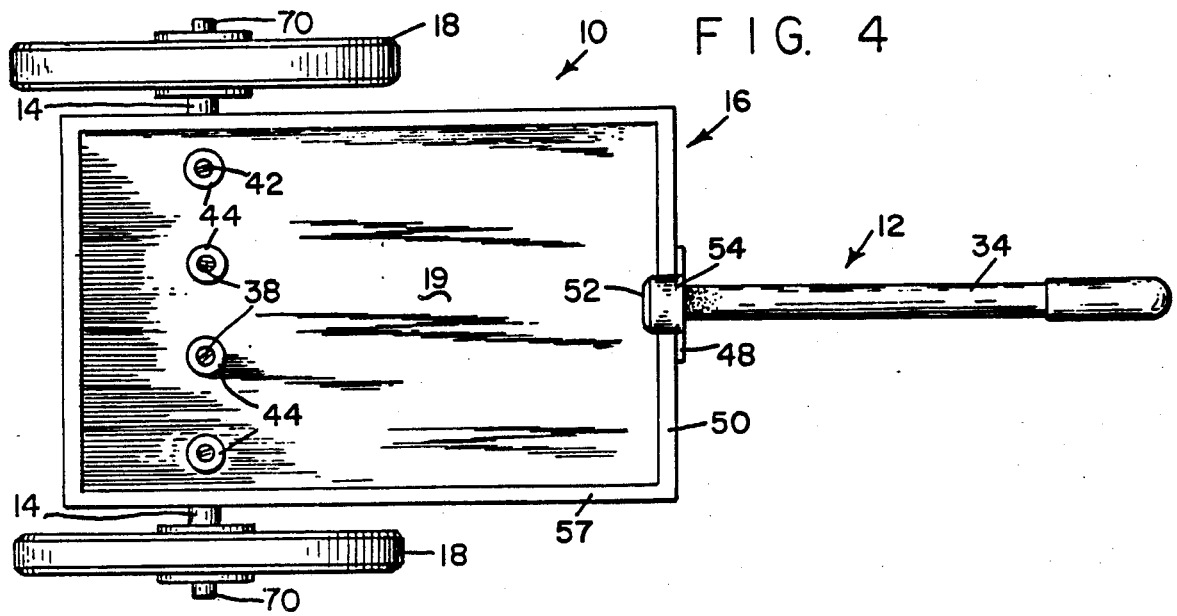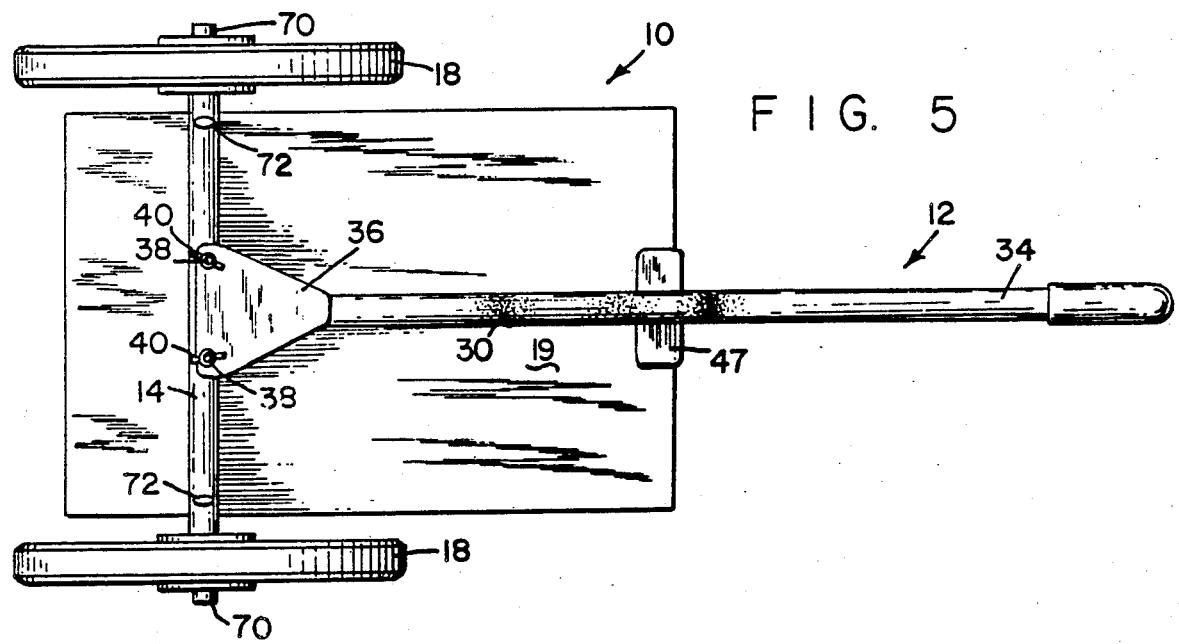

COLLAPSIBLE CART

BACKGROUND OF THE INVENTION

The present invention relates generally to a multi-purpose hand cart and more particularly to a collapsible hand cart which can be broken down into a compact package which can be transported and stored very easily.

Carts have been developed for a variety of purposes and for transporting a variety of goods or products. Despite their usefulness, carts present a storage problem when not in use and are difficult to transport because of their bulk. Some carts have been developed with features for obviating the storage and transportation problems. These features include foldable, telescopic or detachable frame elements which are effective in reducing the overall bulk of the cart. However, in all cases, the storage portion of the cart is an integral rigid structure which can not be broken down. Since the storage portion represents a substantial portion of the cart, storage and transportation of the cart remains a significant problem. These and other difficulties experienced with the prior art carts have been obviated by the present invention.

It is, therefore, a principle object of the invention to provide a collapsible cart which utilizes a collapsible storage basket.

Another object of this invention is the provision of a collapsible cart which utilizes a collapsible storage basket and which includes basket supporting means which automatically support the basket in either its expanded state or its collapsed state.

A further object of the present invention is the provision of a collapsible cart which utilizes a collapsible storage basket and which is capable of being disassembled into a compact package.

It is another object of the present invention to provide a collapsible cart which has a simplified framework which consists essentially of two elongated elements which are detachably connected.

A still further object of the invention is the provision of a collapsible cart which utilizes a collapsible storage basket and detachable elements which are connected by a minimum of finger actuated connecting elements.

It is a further object of the invention to provide a collapsible cart which is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

The invention consists of a collapsible cart having an elongated longitudinal frame member, an elongated horizontal frame member, a pair of wheels which are rotatably mounted on the ends of the cross frame member, a collapsible storage basket having planar rectangular walls which are adapted to be folded into a compact stack and means for supporting the storage basket on the frame members in the expanded state and the collapsed state.

BRIEF DESCRIPTION OF THE DRAWINGS

The character of the invention, however, may be best understood by reference to one of its structural forms, as illustrated by the accompanying drawings, in which:

FIG. 1 is a side elevational view of a cart embodying the principles of the present invention, FIG. 2 is a front elevational view of the cart, FIG. 3 is a rear elevational view of the cart, FIG. 4 is a top plan view of the cart, FIG. 5 is a bottom plan view of the cart.

DESCRIPTION OF THE PREFERRED EMBODIMENT

Figure 6:
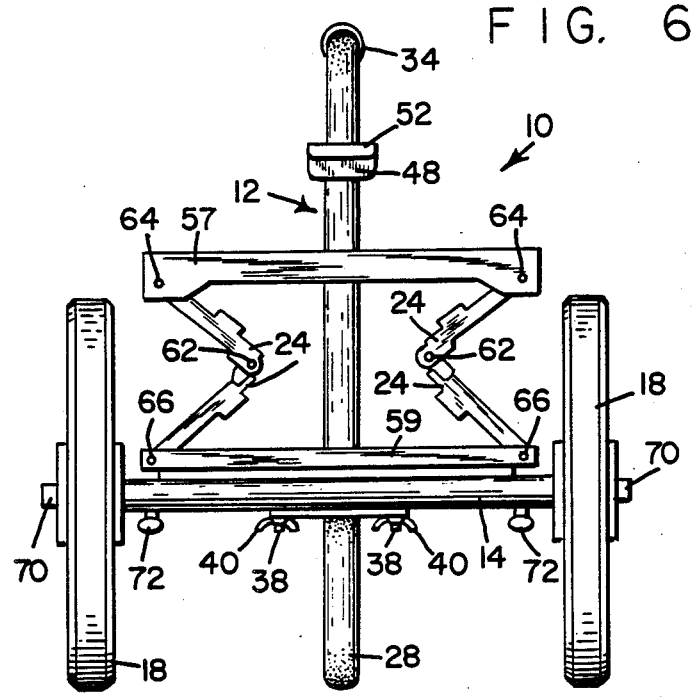
FIG. 6 is a rear elevational view of the cart showing the storage container in a partially collapsed state.

Referring to FIGS. 1-5, the collapsible cart of the present invention is generally indicated by the reference numeral 10 and is shown as being of the type intended for use as a hand cart. The hand cart 10 comprises an elongated horizontal tubular frame member, generally indicated by the reference numeral 12, and a tubular cross frame member 14 which is detachably connected to the longitudinal frame member 12. A collapsible basket, generally indicated by the reference numeral 16, is supported on the frame members 12 and 14 and a pair of wheels 18 are rotatably mounted on the ends of the cross member 14.

The collapsible basket 16 is a commercially available collapsible storage basket and comprises a bottom wall 19, a front wall 20, a back wall 22, and a pair of side walls 24. The bottom wall 18 is horizontal and the walls 20, 22, and 24 are all vertical when the basket 16 is in the expanded condition or state as illustrated in FIGS. 1-3. The horizontal frame member 12 consists of a horizontal rearward portion 26 which is located beneath the bottom wall 19 and a vertical forward portion 28 which extends in front of the front wall 20. The rearward portion 26 and the forward portion 28 are connected by an intermediate portion 30 which is formed into a curved supporting foot 32 where the intermediate portion 30 joins the forward portion 28. A freely extending horizontal handle portion 34 extends forwardly from the top of the forward portion 28.

The longitudinal frame member 12 is detachably connected to the cross frame member 14 by means of a flat plate 36 which is fixed (as for example by welding) to the horizontal rearward portion 26 and which extends freely beneath the cross frame member 14 as shown in FIG. 5. A pair of bolts 38 extends through the bottom wall 19, the cross member 14 and the plate 36 for receiving a pair of wing nuts 40. The bolts 38 and wing nuts 40 detachably connect the plate 36 to the cross member 14 and also connect the rearward portion of the collapsible basket 16 to the cross frame member 14. Additional bolts 42 also connect the collapsible basket 16 to the cross member 14 as shown in FIG. 4. Washers 44 are preferably employed between the heads of the bolts 38 and 42 and the bottom wall 18 to provide a larger bearing surface against the upper surface of the wall 19, particularly when the basket is made of a soft material, such as plastic. The forward end of the basket 16 is supported on a rearwardly extending flange 47 of a first bracket 46 which is fixed to the vertical forward portion 28 of the longitudinal frame member 12. A second bracket 48 is also fixed to the vertical forward portion 28 about the first bracket 46 and includes a rearwardly extending horizontal flange 54 which extends above the front wall 20 and terminates in a downwardly extending lip 52.

The basket 16 also comprises a rectangular top frame 57 which includes a top edge 50. The bottom wall 19 is provided with a rectangular upwardly extending flange 59. The back wall 22 is pivotally connected to the rear end of the top longitudinal legs of the top frame 57 by means of pivot pins 58. The front wall 20 is pivotally connected to the longitudinal legs of the top frame 57 in the same manner as the back wall 22 by means of pivot pins not shown. Each of the side walls 24 is divided into upper and lower portions which are pivotally connected by hinges 62. The upper portion of each side wall 24 is pivotally connected to the cross legs of the top frame 57 by pivot pins 64. The lower portion of each side wall 64 is pivotally connected to the cross legs of the rectangular flange 59 by means of pivot pins 66. When the collapsible basket 16 is in the expanded state as shown in FIGS. 1-5, the flange 50 of the second bracket 48 abuts the top edge of the forward leg of the top frame 57 and the lip 52 extends downwardly inside the top frame 57 as shown in FIG. 1. The second bracket 48, thereby stabilizes the basket 16 and holds it firmly against the forward portion 28 of the frame. Each wheel 18 is rotatably mounted on a shaft 70 which is adapted to be inserted into the open end of the cross frame member 14 and locked in place by a thumb screw 72. The thumb screw 72 is threaded into the cross frame member 14 and engages the shaft 70 which is positioned within the cross member.

Figure 8:
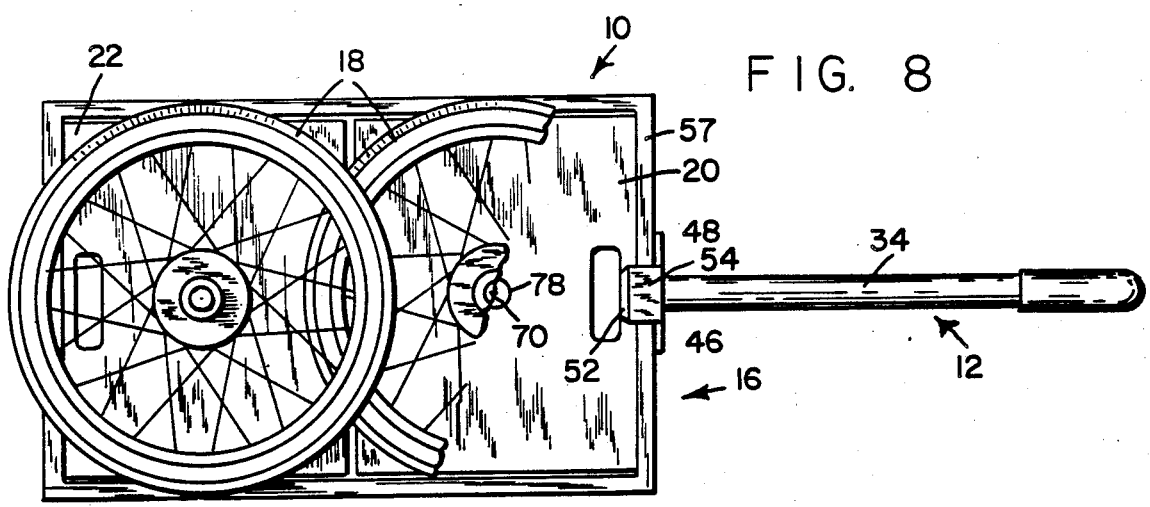
FIG. 8 is a top plan view of the cart showing the storage container in the collapsed state and the cart partially disassembled.
Figure 7:
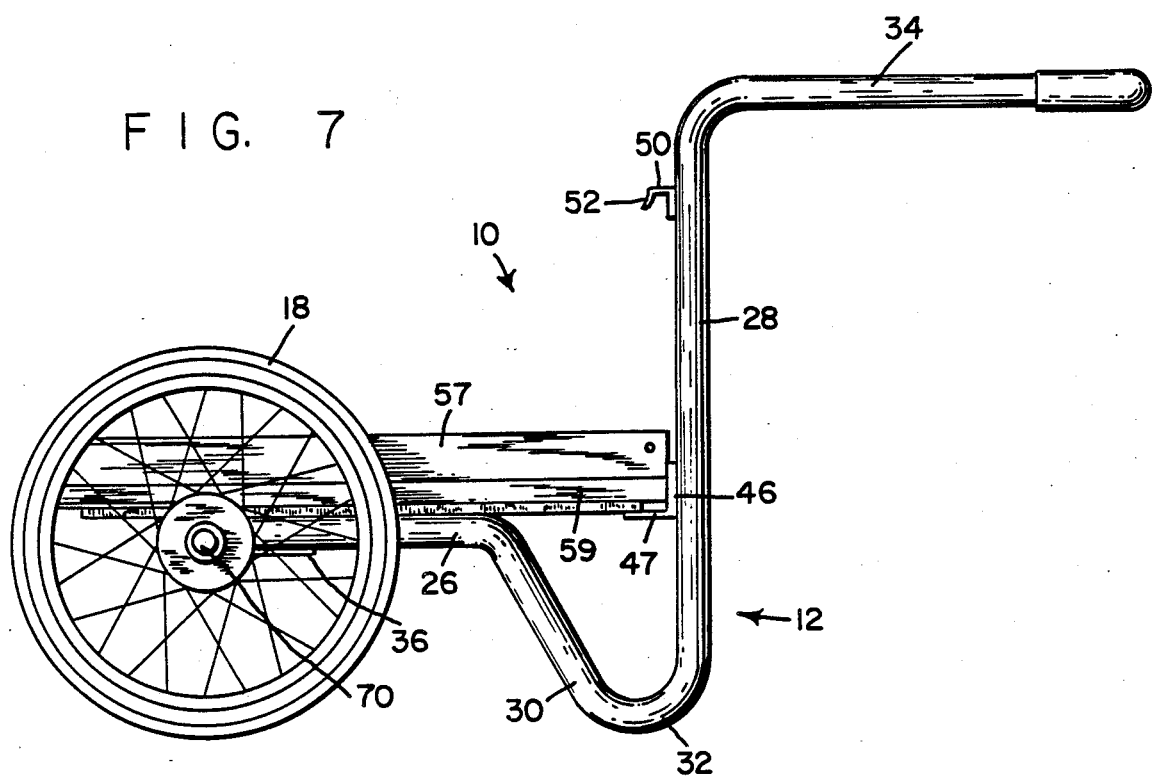
FIG. 7 is a side elevational view of the cart showing the storage container in the fully collapsed state.

The operation and advantages of the present invention will now be readily understood in view of the above description. FIGS. 1-5 show the cart 10 in the fully assembled with the collapsible basket 16 in the fully expanded state. The cart 10 is collapsed by first collapsing the basket 16. The first step in collapsing the basket 16 is to swing the front wall 20 and the rear wall 22 towards the middle of the basket so that both walls lie within the top frame 57. The side walls 24 are then folded about the hinges 62 as shown in FIG. 6 until the top frame 57 rests directly on the top edge of the flange 59 as shown in FIG. 7. The thumb screws 72 are then loosened so that the shafts 70 can be removed from the cross frame member 14. The wheels 18 are removed from the ends of the cross frame member and positioned on top of the collapsed basket 16 so that the shafts 70 extend into appropriate apertures 78 in the front and back walls 20 and 22, respectively as shown in FIG. 8. The last step of disassembling the cart 10 is accomplished by removing the wing nuts 40 from the bolts 38 and lowering the plate 36 away from the bolts 38 to remove the longitudinal frame member 12 from the cross frame member 14. The horizontal frame member 14 is then positioned on top of the wheels 18 to form a complete compact package for storage and transporting. The cart 10 is reassembled by following the steps of disassembly in the reverse order. After the longitudinal frame member 12 is attached to the horizontal frame member 14 the wheels 18 are applied to the ends of the cross frame member 14. The basket 16 is expanded. When expanding the basket 16, the top frame 57 is raised absolutely vertically so that the top edge of a forward leg of the frame 57 passes in front of the lip 52 before abutting the rearwardly extending portion 50 of the second bracket 48. The front and back walls 20 and 22, respectively, are then lowered about the pivot pins 60 and 58, respectively, so that they extend vertically as shown in FIGS. 2 and 3.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Cart comprising:
    (a) an elongated longitudinal frame member having a horizontal rear portion, a vertical forward portion, and a freely extending front end which serves as a handle for the cart,
    (b) an elongated horizontal cross frame member which is operatively connected to the rear end of the longitudinal frame member and which extends at a right angle to said longitudinal frame member,
    (c) a pair of wheels which are rotatably mounted on opposite ends of the cross frame member,
    (d) collapsible storage basket located at the rear of the said vertical portion, the basket having a horizontal bottom wall the basket also having vertical side walls whose lower edges are hingedly connected to the bottom wall, each side wall consisting of an upper and a lower portion joined centrally of the wall by a horizontal hinge to permit folding onto the bottom wall, the basket also having rear and front end walls the upper edges of which are hingedly pivoted to the respective ends of the side walls to permit swinging between the side walls, the basket being movable from an expanded state to a collapsed state in which the side walls and the end walls lie in horizontal orientation on the bottom wall,
    (e) means for connecting the bottom wall to one of said frame members,
    (f) a first bracket which is fixed to the vertical forward portion of said longitudinal frame member for supporting the forward end of the bottom wall, and
    (g) a second basket which is fixed to the vertical forward portion of said longitudinal frame member, said second bracket having a rearwardly extending horizontal portion for freely engaging the top edge of said front wall when said storage basket is moved from the collapsed state to the expanded state and a lip portion which extends downwardly from the rearward end of said horizontal portion for freely engaging a rearward side of said front wall for stabilizing the storage basket when the basket is in the expanded state and preventing relative movement between the storage basket and the longitudinal frame member in a direction rearwardly of said vertical forward portion.

2. Cart as recited in claim 1, wherein the rearward portion of the longitudinal frame member is spaced from the rear portion of the longitudinal frame member and the lower end of said vertical forward portion extends below said rearward portion, and wherein said longitudinal frame member also comprises an intermediate portion which extends from the forward end of said rearward portion to the lower end of said forward portion and defines a supporting foot for said cart where said intermediate portion joins said forward portion.

3. Cart as recited in claim 1, wherein said wheels are removably mounted on said cross frame member.

4. Cart as recited in claim 3, wherein said cross frame member has tubular outer ends and each of said wheels is rotatably mounted on a shaft which is adapted to be inserted into said tubular outer ends, and wherein locking means are provided for locking each of said shafts to said cross frame member.

5. Cart as recited in claim 4, wherein each of said locking means comprises a thumb screw which is threaded into the cross member for engaging said shaft.

* * * * *